US012583448B2

(12) United States Patent
Sonehara et al.

(10) Patent No.: US 12,583,448 B2
(45) Date of Patent: Mar. 24, 2026

(54) OBSTACLE DETECTION CONTROLLER OF ARTICULATED VEHICLE, OPERATION SYSTEM OF ARTICULATED VEHICLE, AND OBSTACLE DETECTION METHOD OF ARTICULATED VEHICLE

(71) Applicant: IHI Corporation, Tokyo (JP)

(72) Inventors: Mitsuharu Sonehara, Tokyo (JP);
Yoshiharu Kaneshima, Tokyo (JP);
Yoshio Katsuki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 122 days.

(21) Appl. No.: 18/619,658

(22) Filed: Mar. 28, 2024

(65) Prior Publication Data

US 2024/0239336 A1      Jul. 18, 2024

Related U.S. Application Data

(63) Continuation of application No. PCT/JP2022/037492, filed on Oct. 6, 2022.

(30) Foreign Application Priority Data

Oct. 15, 2021      (JP) ................................. 2021-169566

(51) Int. Cl.
*B60W 30/095*      (2012.01)
*B60W 10/18*      (2012.01)
(Continued)

(52) U.S. Cl.
CPC ........ *B60W 30/0956* (2013.01); *B60W 10/18* (2013.01); *B60W 10/20* (2013.01); *B60W 60/0015* (2020.02); *B60W 2300/14* (2013.01)

(58) Field of Classification Search
CPC .. B60W 30/0956; B60W 10/18; B60W 10/20; B60W 60/0015; B60W 2300/14;
(Continued)

(56) References Cited

U.S. PATENT DOCUMENTS 10,713,505 B2      7/2020 Broll et al.
2017/0166131 A1      6/2017 Oba
(Continued)

FOREIGN PATENT DOCUMENTS

| JP | 2000-171560 A | 6/2000 |
| JP | 2003-237610 A | 8/2003 |
| JP | 2019-189141 A | 10/2019 |
| WO | 2016/024444 A1 | 2/2016 |

OTHER PUBLICATIONS

Iqbal, Hassan, Stefano Di Cairano, and Karl Berntorp. "Motion Planning of Articulated Vehicles with Active Trailer Steering by Particle Filtering." 2023 IEEE Conference on Control Technology and Applications (CCTA). IEEE, 2023. (Year: 2023).*
(Continued)

*Primary Examiner* — Russell Frejd
*Assistant Examiner* — Ana D Thomas

(57) ABSTRACT

An obstacle detection controller of an articulated vehicle is configured to calculate a surrounding area in a turning direction of a towing vehicle and a towed vehicle, calculate a passage prediction area, calculate an area in which the surrounding area and the passage prediction area overlap as a monitoring area, and output an obstacle detection information indicating that an obstacle that may be entrapped by a turning of the towing vehicle and the towed vehicle has been detected, in response to the obstacle detected by an obstacle sensor being detected within the monitoring area.

8 Claims, 16 Drawing Sheets

(51) Int. Cl.
    *B60W 10/20*        (2006.01)
    *B60W 60/00*        (2020.01)
(58) Field of Classification Search
    CPC .......... B60R 21/00; G08G 1/16; G08G 1/166;
           G08G 1/0112; G08G 1/052; G01B 11/26;
                                            G01P 1/07
    See application file for complete search history.

(56) References Cited

U.S. PATENT DOCUMENTS

2019/0325233 A1 * 10/2019 Broll ...................... B60R 11/04
2020/0331527 A1 * 10/2020 Kim ..................... B62D 15/021
2024/0101116 A1 * 3/2024 Totzke ............ B60W 30/18145

OTHER PUBLICATIONS

Beyersdorfer, Susann, and Sebastian Wagner. "Novel model based path planning for multi-axle steered heavy load vehicles." 16th International IEEE Conference on Intelligent Transportation Systems (ITSC 2013). IEEE, 2013. (Year: 2013).*

Intellectual Property Office of Singapore, "Invitation to Respond to Written Opinion," issued in Singaporean Patent Application No. 11202402245W, which is a counterpart to U.S. Appl. No. 18/619,658, on Sep. 13, 2025, 10 pages.

European Patent Office, "Extended European Search Report", issued in European Patent Application No. 22880919.0, which is a counterpart to U.S. Appl. No. 18/619,658, on Sep. 9, 2025, 10 pages.

* cited by examiner

OBSTACLE DETECTION CONTROLLER OF ARTICULATED VEHICLE, OPERATION SYSTEM OF ARTICULATED VEHICLE, AND OBSTACLE DETECTION METHOD OF ARTICULATED VEHICLE

CROSS REFERENCE TO RELATED APPLICATIONS

This application is a continuation application of International Application No. PCT/JP2022/037492, filed on Oct. 6, 2022, which claims priority to Japanese Patent Application No. 2021-169566, filed on Oct. 15, 2021, the entire contents of which are incorporated by reference herein.

TECHNICAL FIELD

The present disclosure relates to an obstacle detection controller of an articulated vehicle, an operation system of an articulated vehicle, and an obstacle detection method of an articulated vehicle.

BACKGROUND ART

In an articulated vehicle, a towing vehicle on a head side and a towed vehicle on a chassis side are connected by a coupling mechanism comprised of a coupler on the head side and a kingpin on the chassis side. Since the articulated vehicle configured in this way has a large inner wheel difference, there is a risk of entrapping surrounding obstacles when turning while driving.

In order to prevent the entrapment of surrounding obstacles when turning the articulated vehicle, there is a technique for predicting the turning trajectory of the articulated vehicle and determining whether or not an obstacle exists in the predicted trajectory (see Patent Literature 1).

In the vehicle entrapment prevention device using such a technology, for example, an actual steering angular speed is calculated from the actual steering angle of the detected articulated vehicle, and the future turning trajectory of the articulated vehicle is calculated based on the actual steering angle, the actual steering angular speed, and the detected vehicle speed. Then, the device sets an area through which the articulated vehicle will pass after a predetermined time based on the future turning trajectory, and detects obstacles that may be entrapped by determining whether or not an obstacle recognized by a scanning radar that monitors the surrounding of the vehicle exists in the set area. This entrapment prevention device of vehicle can predict the turning trajectory from the start of the turn of the articulated vehicle to the steady turn, and can set the area to be monitored when turning the articulated vehicle.

CITATION LIST

Patent Literature

Patent Literature 1: Japanese Patent Laid-Open Publication No. 2000-171560

SUMMARY OF THE INVENTION

Technical Problem

When the articulated vehicle turns, a connection angle between the towing vehicle and the towed vehicle changes according to the steering angle, and the relative position of the towed vehicle with respect to the towing vehicle and the attitude of the articulated vehicle are also changed. Therefore, when the scanning radar used for obstacle detection processing as described above is installed on the towing vehicle, a part of the towed vehicle is included in the detection range by the scanning radar, and the towed vehicle may be mistakenly recognized as an obstacle. Further, when the scanning radar is installed on the towed vehicle, a part of the towing vehicle is included in the detection range by the scanning radar, and there is a risk that the towing vehicle is mistakenly recognized as an obstacle. If such a false recognition occurs, the detection accuracy of obstacles that may be entrapped when turning the articulated vehicle may be reduced.

An object of the present disclosure is to provide an obstacle detection controller of an articulated vehicle, an operation system of an articulated vehicle, and an obstacle detection method of an articulated vehicle, which can accurately detect an obstacle that may be entrapped when the articulated vehicle is turning while driving.

Solution to Problem

An obstacle detection controller of an articulated vehicle, of the present disclosure, is connected to an obstacle sensor configured to detect obstacles in a surrounding of a towing vehicle and a towed vehicle towed by the towing vehicle. The obstacle detection controller is configured to calculate a surrounding area in a turning direction of the towing vehicle and the towed vehicle when the towing vehicle and the towed vehicle turn, calculate a passage prediction area when the towing vehicle and the towed vehicle turn, calculate an area in which the surrounding area and the passage prediction area overlap as a monitoring area, and output an obstacle detection information indicating that an obstacle that may be entrapped by a turning of the towing vehicle and the towed vehicle has been detected, in response to the obstacle detected by the obstacle sensor being detected within the monitoring area.

The obstacle detection controller may be configured to calculate an area excluding an area in front of the towing vehicle as the monitoring area.

The obstacle detection controller may be configured to calculate, as the passage prediction area, an area to be passed by the towing vehicle and the towed vehicle before traveling a braking distance on a turning trajectory.

The obstacle detection controller may be configured to calculate, as the passage prediction area, a first passage prediction area through which the towing vehicle and the towed vehicle pass before moving the braking distance by stopping suddenly, and a second passage prediction area through which the stopped towing vehicle and the towed vehicle pass before moving the braking distance by stopping slowly. The obstacle detection controller may be configured to calculate an area in which the surrounding area and the first passage prediction area overlap as a first monitoring area, and an area in which the surrounding area and the second passage prediction area overlap as a second monitoring area. The obstacle detection controller may be configured to output an obstacle detection information to which information indicating whether a position of the detected obstacle is in the first monitoring area or the second monitoring area is added in response to the obstacle being detected by the obstacle sensor in the first monitoring area or the second monitoring area.

An operation system of an articulated vehicle, of the present disclosure, comprises an operation controller connected to the obstacle detection controller. The operation controller may output a stop instruction to the towing vehicle in response to acquiring the obstacle detection information output from the obstacle detection controller.

An operation system of an articulated vehicle, of the present disclosure, comprises an operation controller connected to the obstacle detection controller. The operation controller may determine whether a position of the obstacle is within the first monitoring area or the second monitoring area based on the information added to the obstacle detection information in response to acquiring obstacle detection information output from the obstacle detection controller, output a sudden stop instruction to the towing vehicle in response to determining that the position of the obstacle is within the first monitoring area, and output a slow stop instruction to the towing vehicle in response to determining that the position of the obstacle is within the second monitoring area.

The operation controller may output an instruction to maintain a current steering angle in response to acquiring the obstacle detection information output from the obstacle detection controller.

The towing vehicle may include an autonomous driving mechanism. The operation controller may output the stop instruction and the instruction to maintain the steering angle to the autonomous driving mechanism.

An obstacle detection method of an articulated vehicle, of the present disclosure, detects an obstacle in a surrounding of a towing vehicle and a towed vehicle towed by the towing vehicle. The obstacle detection method comprises a surrounding area calculation step for calculating a surrounding area in a turning direction of the towing vehicle and the towed vehicle when the towing vehicle and the towed vehicle turn, a passage prediction area calculation step for calculating a passage prediction area when the towing vehicle and the towed vehicle turn, a monitoring area calculation step for calculating an area in which the surrounding area detected by the surrounding area calculation step and the passage prediction area calculated by the passage prediction area calculation step overlap as a monitoring area, and an obstacle detection step for outputting an obstacle detection information indicating that an obstacle that may be entrapped by a turning of the towing vehicle and the towed vehicle has been detected, in response to the obstacle detected by an obstacle sensor being detected within the monitoring area, wherein the obstacle sensor is configured to detect an obstacle in a surrounding of the towing vehicle and the towed vehicle.

Effects of Invention

According to the obstacle detection controller of the articulated vehicle, the operation system of the articulated vehicle, and the obstacle detection method of the articulated vehicle, of the present disclosure, an obstacle that may be entrapped when the articulated vehicle is turning while driving can be accurately detected.

BRIEF DESCRIPTION OF DRAWINGS

FIG. 1A is a diagram viewed from the side of an articulated vehicle equipped with an autonomous driving system using an obstacle detection device according to the first embodiment.

FIG. 1B is a diagram viewed from above of an articulated vehicle equipped with an autonomous driving system using the obstacle detection device according to the first embodiment.

FIG. 10A is a diagram viewed from the side of an articulated vehicle equipped with an autonomous driving system using the obstacle detection device according to the second embodiment.

FIG. 10B is a diagram viewed from above of an articulated vehicle equipped with an autonomous driving system using the obstacle detection device according to the second embodiment.

DESCRIPTION OF EMBODIMENTS

Figure 2:
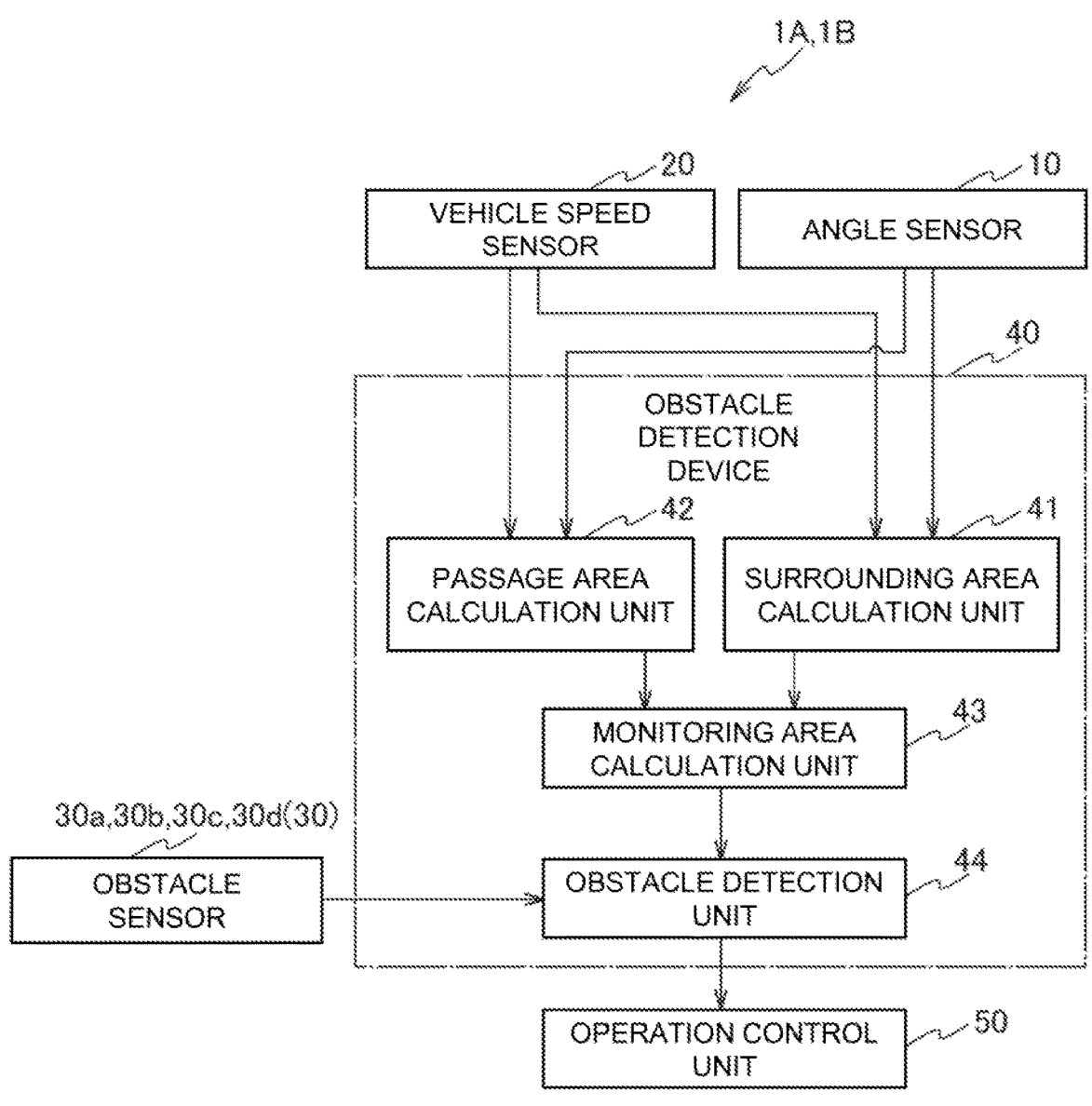
FIG. 2 is a block diagram showing an example of a configuration of an autonomous driving system using the obstacle detection device according to the first embodiment or the second embodiment.

First Embodiment (Configuration of an Autonomous Driving System Using an Obstacle Detection Device of an Articulated Vehicle According to the First Embodiment)

The configuration of an autonomous driving system using an obstacle detection device of an articulated vehicle according to the first embodiment will be described with reference to FIGS. 1A, 1B, and 2. The autonomous driving system 1A according to the present embodiment is mounted on, for example, an articulated vehicle C. The articulated vehicle C exemplified in the figures is comprised of a towing vehicle X on the head side and a towed vehicle Y on the chassis side, and the towing vehicle X and the towed vehicle Y are connected by a coupling mechanism Z. Further, the towing vehicle X may include an autonomous driving mechanism (not shown). In the following description, a vehicle equipped with the autonomous driving mechanism is referred to as an autonomous driving vehicle.

The autonomous driving mechanism of the towing vehicle X can control an autonomous driving function of the towing vehicle X based on instructions output from an operation control unit 50 described later. The configuration of the autonomous driving mechanism is not particularly limited. For example, the autonomous driving mechanism may include an ECU (Electronic Control Unit, not shown), a steering control unit (not shown), and a brake control unit (not shown). The operation control unit 50 may also serve as the ECU. The steering control unit may be, for example, a steering actuator that drives in response to a signal output from the ECU. That is, the steering control unit can set the steering angle of the towing vehicle X. The brake control unit may be, for example, a brake motor driven in response to a signal output from the ECU. The brake motor can set a pressing force of a brake pad on a brake rotor and control a deceleration of the towing vehicle X. That is, the brake control unit can control the deceleration of the towing vehicle X. In addition, by-wire technology may be applied to the autonomous driving mechanism. The by-wire technology may include steering-by-wire technology and brake-by-wire technology. The autonomous driving function is a function that automatically controls the operation of the vehicle based on the surrounding conditions of the vehicle, the state of the vehicle, and the like, regardless of driving operations such as steering and pedal operation by the occupants. When the towing vehicle X is equipped with an autonomous driving function, the towing vehicle X is capable of autonomous driving that automatically accelerates, decelerates, steers, and the like without operation by the occupants. Further, the autonomous driving may include a case where acceleration, deceleration, steering, etc. of the towing vehicle X are automatically performed without operation by the occupant in a predetermined traveling environment such as in any facility, for example.

Figure 1A:
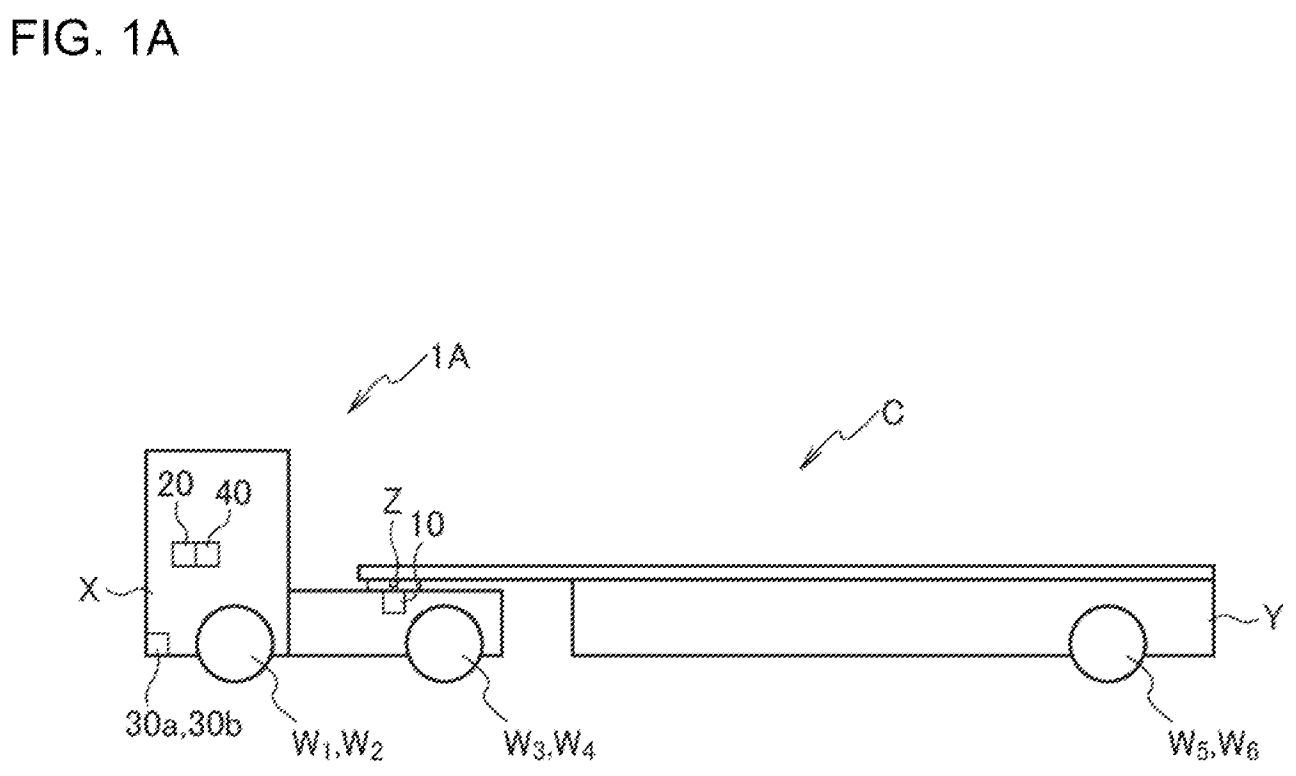
Figure 1B:
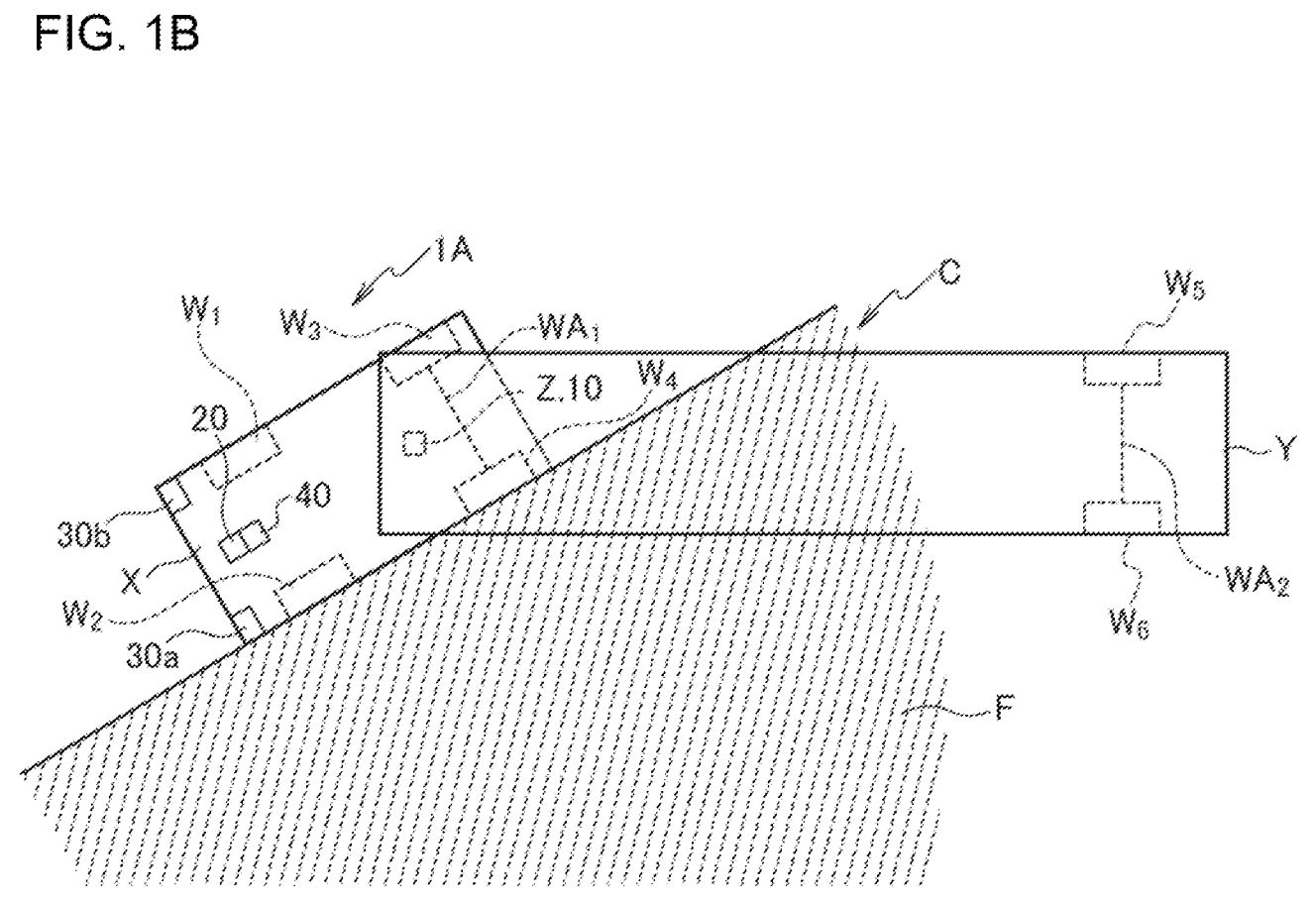

FIG. 1A is a diagram viewed from the side of the articulated vehicle C equipped with the autonomous driving system 1A, and FIG. 1B is a diagram viewed from above when the articulated vehicle C is turning to the left. FIG. 2 is a block diagram showing an example of the configuration of the autonomous driving system.

The towing vehicle X exemplified in the figures includes front wheels $W_1$ and $W_2$ and rear wheels $W_3$ and $W_4$ connected in the vehicle width direction by axle $WA_1$. The rear wheels $W_3$ and $W_4$ are drive wheels. That is, the axle $WA_1$ is a drive shaft that connects a pair of drive wheels in the width direction. The drive shaft is not limited to an integrally formed shaft, and may be divided, for example, at a predetermined position. Further, the towed vehicle Y includes wheels $W_5$ and $W_6$ connected by axle $WA_2$.

As illustrated in FIG. 2, the autonomous driving system 1A includes an obstacle detection device 40 (an obstacle detection controller) and an operation control unit 50 (an operation controller). Further, the autonomous driving system 1A exemplified in the figure includes obstacle sensors 30a and 30b as obstacle sensors 30. The obstacle sensor 30 can detect one or more obstacles in the vicinity of the towing vehicle X and the towed vehicle Y. The obstacle sensor 30 is connected to the obstacle detection device 40. Further, an angle sensor 10 and a vehicle speed sensor 20 may be connected to the obstacle detection device 40.

The angle sensor 10 detects the connection angle between the towing vehicle X and the towed vehicle Y by the coupling mechanism Z. The vehicle speed sensor 20 detects the vehicle speed of the articulated vehicle C. The obstacle sensor 30a may be installed on the left side of the towing vehicle X and may be able to detect obstacles that are within the range F, for example, 180° along the left side of the towing vehicle X, as exemplified in FIG. 1B. The obstacle sensor 30b may be installed on the right side of the towing vehicle X and may be able to detect obstacles within the range of, for example, 180° along the right side of the towing vehicle X. The obstacle sensors 30a and 30b may be configured with, for example, an optical sensor.

The obstacle detection device 40 includes a surrounding area calculation unit 41, a passage area calculation unit 42, a monitoring area calculation unit 43, and an obstacle detection unit 44. The obstacle detection device 40 may include a general-purpose microcomputer having a CPU (Central Processing Unit), a memory, an input/output unit, and the like. In the memory of the microcomputer, a computer program is installed that includes a predetermined rule or instruction for detecting obstacles that may be entrapped by the turning of the articulated vehicle C. By executing the computer program, the microcomputer can perform a process for detecting the obstacle. Further, the obstacle that may be entrapped by the turning of the articulated vehicle C is, for example, an obstacle that may collide with the side of the towing vehicle X or the side of the towed vehicle Y on the turning direction side when the traveling articulated vehicle C turns. That is, "entrapment" means a collision between an obstacle and the side of the turning direction side of the articulated vehicle C.

The surrounding area calculation unit 41 calculates, for example, a surrounding area on the turning direction side of the towing vehicle X and the towed vehicle Y in a case that the towing vehicle X and the towed vehicle Y turn when the connection angle is equal to or greater than a predetermined value and the vehicle speed is equal to or greater than a predetermined value. The surrounding area is an area extending around the articulated vehicle C and surrounds the articulated vehicle C. The passage area calculation unit 42 calculates, for example, a passage prediction area in a case that the connection angle detected by the angle sensor 10 is equal to or greater than a predetermined value and the vehicle speed detected by the vehicle speed sensor 20 is equal to or greater than a predetermined value. The passage prediction area may be an area in which the towing vehicle X and the towed vehicle Y are predicted to pass by the time they move the braking distance on the turning trajectory. The braking distance is the distance traveled from the time the brakes are applied to the time the vehicle stops.

The monitoring area calculation unit 43 calculates a monitoring area. The monitoring area is an area in which the surrounding area calculated by the surrounding area calculation unit 41 and the passage prediction area calculated by the passage area calculation unit 42 overlap. Among the obstacles detected by the obstacle sensors 30a and 30b, the obstacle detection unit 44 detects an obstacle within the monitoring area calculated by the monitoring area calculation unit 43 as an obstacle that may be entrapped by the turning of the towing vehicle X and the towed vehicle Y. Further, if the obstacle sensors 30a and 30b detect one obstacle and the obstacle is within the monitoring area, the obstacle may be detected as an obstacle that may be entrapped by the turning of the towing vehicle X and the towed vehicle Y. When the obstacle detection unit 44 detects an obstacle that may be entrapped due to the turning of the towing vehicle X and the towed vehicle Y, an obstacle detection information is output to the operation control unit 50. The obstacle detection information is information indicating that an obstacle that may be entrapped by the turning of the towing vehicle X and the towed vehicle Y has been detected.

The operation control unit 50 is connected to the obstacle detection device 40 and can control the traveling of the towing vehicle X. The operation control unit 50 may control the traveling of the towing vehicle X by outputting an instruction to the autonomous driving mechanism. Further, when the operation control unit 50 acquires the obstacle detection information from the obstacle detection unit 44, it outputs a command to maintain the steering angle to the towing vehicle X, and further outputs a stop instruction to control the autonomous driving mechanism. The stop instruction is an instruction to stop the operation of the towing vehicle X. The operation control unit 50 may include a general-purpose microcomputer having a CPU, a memory, an input/output unit, and the like. In the memory of the microcomputer, a computer program is installed that includes default rules or instructions for controlling the traveling of the towing vehicle X. By executing the computer program, the microcomputer can execute a process for controlling the traveling of the towing vehicle X.

(Operation of the Autonomous Driving System According to the First Embodiment)

Next, an example of the operation of the autonomous driving system 1A according to the present embodiment will be described with reference to the flowchart of FIG. 3. In the present embodiment, while the articulated vehicle C is traveling, the angle sensor 10 detects the connection angle between the towing vehicle X and the towed vehicle Y under the coupling mechanism Z at a predetermined time interval, and the vehicle speed sensor 20 detects the vehicle speed of the articulated vehicle C at a predetermined time interval. Further, the obstacle sensor 30a detects obstacles in the surrounding of the left side of the towing vehicle X and the towed vehicle Y at a predetermined time interval, and the obstacle sensor 30b detects obstacles in the surrounding of the right side of the towing vehicle X and the towed vehicle Y.

When the vehicle speed sensor 20 detects a vehicle speed equal to or greater than a first threshold and the angle sensor 10 detects a connection angle equal to or greater than a second threshold ("YES" in step S1), the obstacle detection device 40 executes a calculation process of the monitoring area for monitoring the presence or absence of obstacles (step S2). Here, a speed at which it can be recognized that the articulated vehicle C is traveling may be set in advance as the first threshold. Further, an angle at which it can be recognized that the articulated vehicle C is turning may be set in advance as the second threshold.

An example of the calculation process of the monitoring area executed by the obstacle detection device 40 in step S2 will be described with reference to the flowchart of FIG. 4. When the calculation process of the monitoring area is started, the surrounding area calculation unit 41 first calculates the surrounding area on the turning direction side of the towing vehicle X and the towed vehicle Y (step S21).

Figure 5:
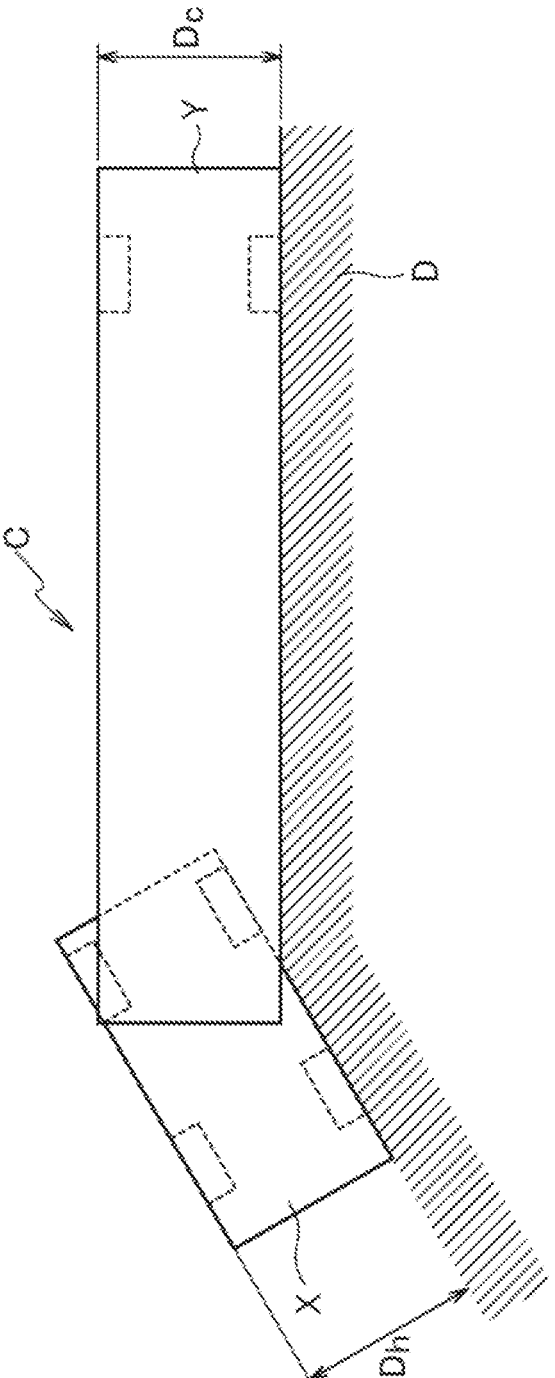
FIG. 5 is a diagram showing a surrounding area calculated by the obstacle detection device according to the first embodiment.

For example, when the articulated vehicle C is turning to the left as shown in FIG. 5, the surrounding area D on the left side of the towing vehicle X and the towed vehicle Y is calculated, based on the vehicle widths of the towing vehicle X and the towed vehicle Y and the detected connection angle. As the vehicle width of the towing vehicle X used for the calculation of the surrounding area D, a value Dh1 may be used, wherein the value Dh1 is obtained by adding a margin a for absorbing a cumulative error and a measurement error to an actual vehicle width Dh of the actual towing vehicle X. Further, as the vehicle width of the towed vehicle Y, a value Dc1 may be used wherein the value Dc1 is obtained by adding the margin a to the actual vehicle width Dc.

Further, when the calculation process of the monitoring area is started, the passage area calculation unit 42 calculates the passage prediction area until the towing vehicle X and the towed vehicle Y move by the braking distance on the turning trajectory. An example of the calculation process of the passage prediction area of the towing vehicle X and the towed vehicle Y will be described with reference to FIGS. 6-8.

Figure 4:
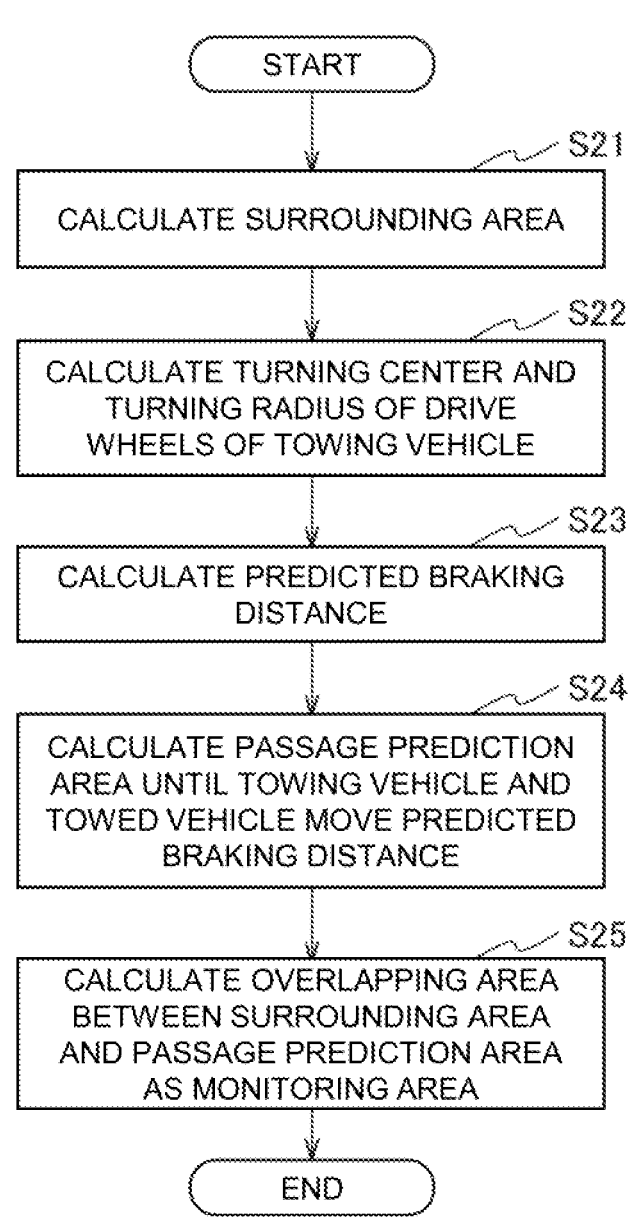
FIG. 4 is a flowchart showing an example of an operation of a calculation process of a monitoring area executed by the obstacle detection device according to the first embodiment.
Figure 6:
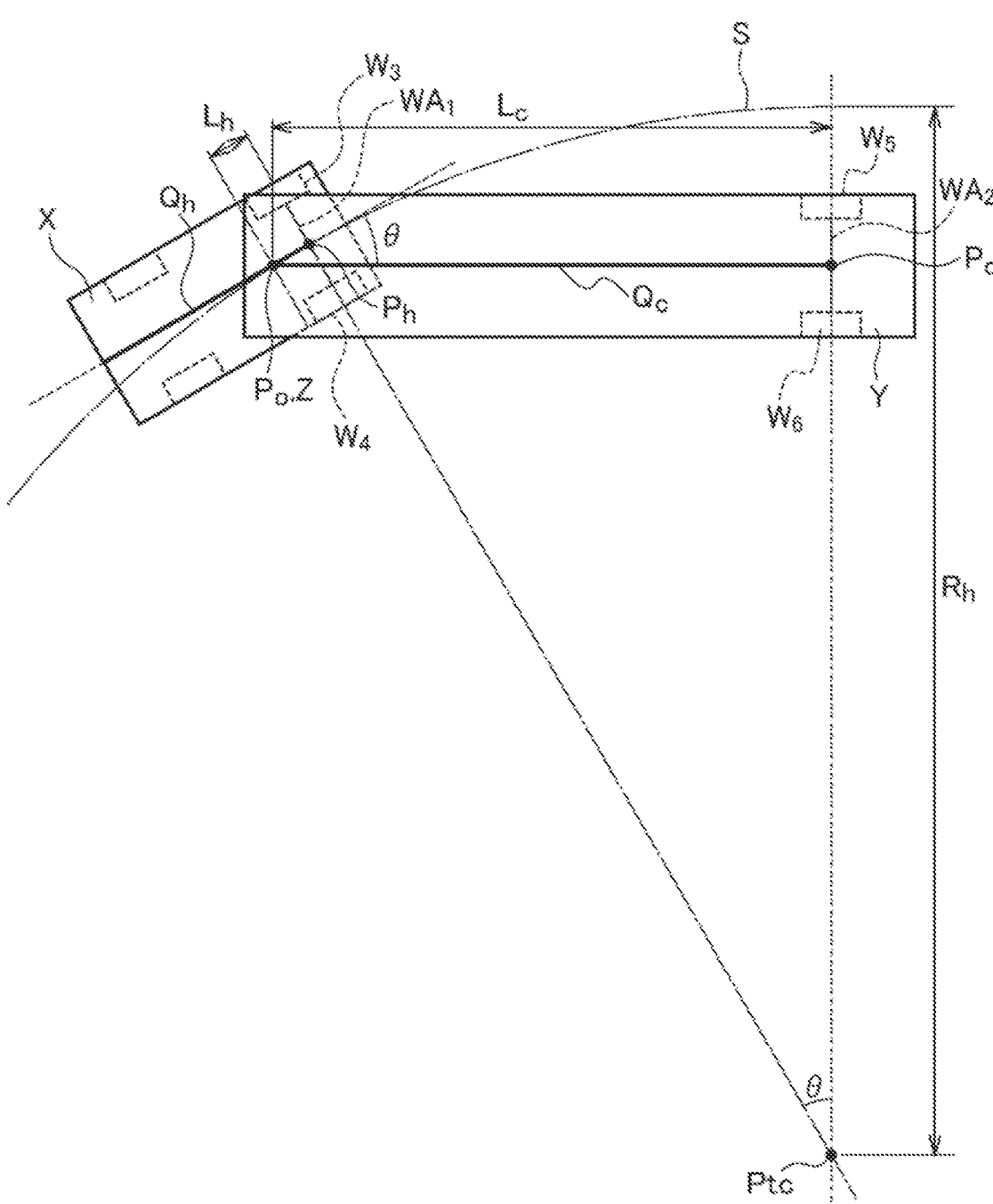
FIG. 6 is an explanatory diagram of a turning center and a turning radius of the axle of the towing vehicle X calculated by the obstacle detection device according to the first embodiment.
Figure 7:
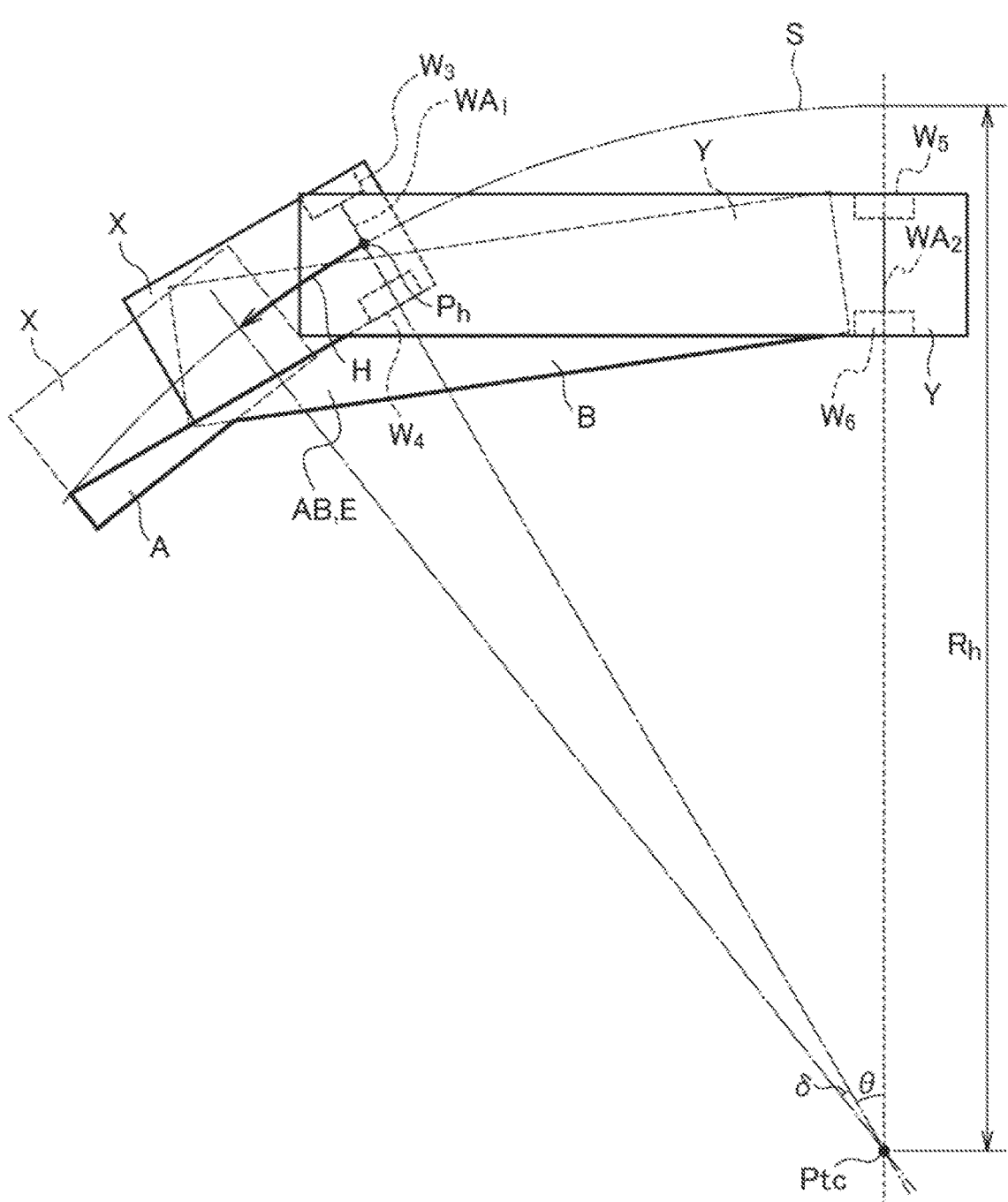
FIG. 7 is an explanatory diagram of the predicted braking distance and monitoring area of the towing vehicle X calculated by the obstacle detection device according to the first embodiment.

First, the passage area calculation unit 42 calculates the turning center and the turning radius of the axle $WA_1$ of the rear wheels $W_3$ and $W_4$, which are the drive wheels of the towing vehicle X, based on the connection angle detected by the angle sensor 10 (step S22 in FIG. 4). As shown in FIG. 6, the angle sensor 10 detects the angle θ formed by the line Qh and the line Qc as the connection angle. The line Qh is a line connecting the connection position Po and the center Ph of the axle $WA_1$ in the direction in which the axle $WA_1$ is extended. The line Qc is a line connecting the connection position Po between the towing vehicle X and the towed vehicle Y and the center Pc of the axle $WA_2$ in the direction in which the axle $WA_2$ of the towed vehicle Y is extended. This connection angle is equal to the angle formed by the axle $WA_1$ of the towing vehicle X and the axle $WA_2$ of the towed vehicle Y, and the passage area calculation unit 42 recognizes this angle as the turning angle θ.

The passage area calculation unit 42 calculates the intersection point between the extension line of the axle $WA_1$ of the towing vehicle X and the extension line of the axle $WA_2$ of the towed vehicle Y as the turning center Ptc of the center Ph of the axle $WA_1$. Further, the passage area calculation unit 42 calculates the distance between the center Ph of the axle $WA_1$ and the turning center Ptc as the turning radius Rh of the center Ph of the axle $WA_1$.

The turning radius Rh of the center Ph of the axle $WA_1$ is calculated by the following equation (1).

[Equation 1]

$$R_h = \frac{L_c - L_h/\cos\theta}{\sin\theta} + L_h \cdot \tan\theta \tag{1}$$

Here, Lc is the distance between the connection position Po and the center Pc of the axle $WA_2$ of the towed vehicle Y, and Lh is the distance between the connection position Po and the center Ph of the axle $WA_1$.

Next, the passage area calculation unit 42 calculates the predicted braking distance of the center Ph of the axle $WA_1$ (step S23 in FIG. 4). In the state exemplified in FIG. 7, the towing vehicle X and the towed vehicle Y of the articulated vehicle C traveling at a predetermined speed are present at the positions indicated by the solid line. The predicted braking distance of the center Ph of the axle $WA_1$ will be explained by taking as an example a case where the articulated vehicle C is decelerated at a predetermined speed and stopped by applying a brake from such a state.

Figure 8:
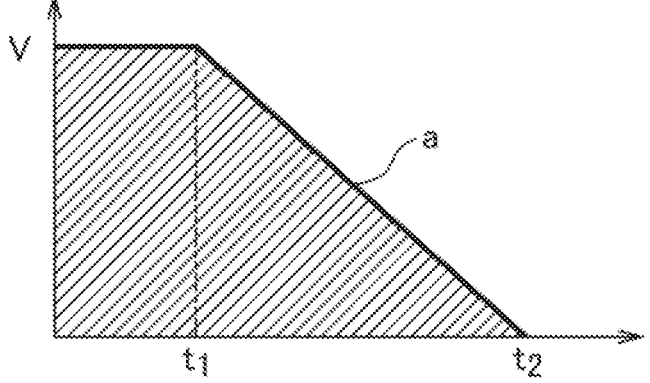
FIG. 8 is an explanatory diagram of a vehicle stop model held by the obstacle detection device according to the first embodiment.

The passage area calculation unit 42 holds information set in advance, where the information is on a vehicle stop model and indicates a relationship between a speed change when the articulated vehicle C stops and a time until the stop. This model is equivalent to the vehicle stop model used when the articulated vehicle C detects an obstacle and stops. FIG. 8 shows an example of the vehicle stop model held by the passage area calculation unit 42.

FIG. 8 shows the vehicle stop model in a case that the articulated vehicle C travels at a speed V, brakes at time $t_1$, decelerates at deceleration a, and stops at a stop time $t_2$. The area indicated by the diagonal lines in FIG. 8 corresponds to the predicted braking distance H of the center Ph of the axle $WA_1$ (see FIG. 7). More specifically, the predicted braking distance H is calculated by the following equation (2).

[Equation 2]

$$H = \left(VT + \frac{V^2}{2\alpha}\right) \times S + H_s \quad (2)$$

Here, T is the time of the difference between the time $t_1$ and the time $t_2$, S is a safety factor reflecting the margin for error and the like, and Hs is the distance of the margin for detecting contact with the obstacle in advance.

The passage area calculation unit 42 calculates the predicted braking distance H using this vehicle stop model. Further, the passage area calculation unit 42 calculates a position where the center Ph of the axle $WA_1$ has moved on the arc S by the predicted braking distance H as the predicted stop position. The arc S is a turning trajectory with Ptc as the turning center and Rh as the turning radius. For example, when the towing vehicle X and the towed vehicle Y are in the positions indicated by the solid lines of FIG. 7, the passage area calculation unit 42 calculates the positions of the towing vehicle X and the towed vehicle Y indicated by the dotted lines as the predicted stop positions.

At this time, the predicted braking distance H corresponds to the distance over which the center Ph of the axle $WA_1$ moved on the arc S by an angle of $\delta$ with respect to the turning center Ptc, and the angle $\delta$ is indicated by the following equation (3).

[Equation 3]

$$\delta = \frac{H}{R_h} \quad (3)$$

Next, the passage area calculation unit 42 calculates the passage prediction area until the center Ph of the axle $WA_1$ moves the predicted braking distance H on the turning trajectory and stops at the predicted stop position (step S24 in FIG. 4). This passage prediction area is the area AB that combines the passage prediction area A of the towing vehicle X and the passage prediction area B of the towed vehicle Y, which are surrounded by the thick lines in FIG. 7. Note that the passage prediction area A is an area in which the passage of the towing vehicle X is predicted. The passage prediction area B is the area in which the passage of the towed vehicle Y is predicted.

Next, the passage area calculation unit 42 calculates an overlapping area between the surrounding area D calculated in step S21 and the passage prediction area AB calculated in step S24 as the monitoring area E (see step S25 in FIG. 4). The monitoring area E is an area where the presence or absence of obstacles that may be entrapped by the turning of the articulated vehicle C is monitored. The explanation of the calculation process of the monitoring area ends.

Figure 3:
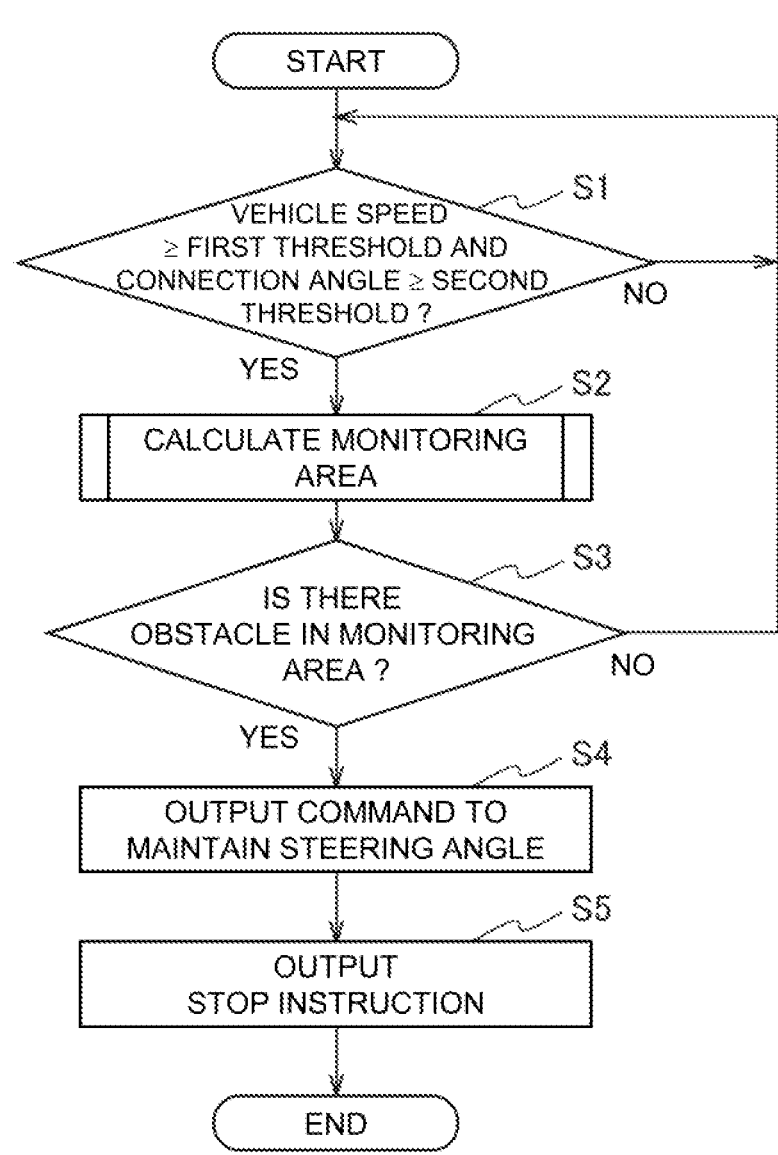
FIG. 3 is a flowchart showing an example of an operation performed by the obstacle detection device according to the first embodiment when the articulated vehicle turns.

Returning to the flowchart of FIG. 3, the obstacle detection unit 44 determines whether or not there is an obstacle in the monitoring area E based on the information detected by the obstacle sensor 30 (step S3). When the obstacle detection unit 44 determines that there is an obstacle in the monitoring area E ("YES" in step S3), the obstacle detection information is output to the operation control unit 50. The obstacle detection information is information indicating that an obstacle that may be entrapped by the turning of the articulated vehicle C has been detected.

When the operation control unit 50 acquires the obstacle detection information, the operation control unit 50 outputs a command to maintain the steering angle to the towing vehicle X (step S4), and further outputs a stop instruction (step S5). Based on the command acquired from the operation control unit 50, the towing vehicle X stops the vehicle body by decelerating with a deceleration based on the vehicle stop model of FIG. 8 while maintaining the steering angle by the autonomous driving. Maintaining the steering angle of the towing vehicle X may be performed, for example, by maintaining command value for the steering angle or by locking the steering. Further, the stop of the towing vehicle X may be executed by outputting a command to reduce vehicle speed to zero to the ECU or the by-wire device installed on the towing vehicle X.

In step S3, when the obstacle detection unit 44 determines that there is no obstacle in the monitoring area E ("NO" in step S3), the process returns to step S1 and the process is repeated.

According to the above first embodiment, when the traveling articulated vehicle C turns, it is suppressed that a part of the body of the articulated vehicle C is misrecognized as an obstacle. Therefore, it is possible to accurately detect obstacles that may be entrapped by turning. Thereby, it is possible to suppress the occurrence of a collision between the detected obstacle and the articulated vehicle C. Furthermore, it is possible to suppress the deceleration or stop of the articulated vehicle C due to misrecognition of an obstacle. That is, the articulated vehicle C can be driven more appropriately.

Further, when an obstacle that may be entrapped is detected, the operation control unit 50 can output an instruction to the autonomous driving mechanism to perform a brake operation while maintaining the steering angle of the articulated vehicle C. Therefore, it is possible to suppress an increase in the risk of contact between the articulated vehicle C and the obstacle due to changing the steering angle to move toward the obstacle during the idle traveling time after braking operation.

Further, the monitoring area E can be accurately calculated by using a model equivalent to the vehicle stop model for detecting an obstacle and stopping as a vehicle stop model for calculating the braking distance of the articulated vehicle C during turning.

In the first embodiment described above, since an inner wheel difference occurs when the articulated vehicle C turns while traveling, the trajectory of movement of the towing vehicle X is smaller than the trajectory of the movement of the towed vehicle Y. Therefore, the passage prediction area B of the towed vehicle Y is larger than the passage prediction area A of the towing vehicle X.

Figure 9:
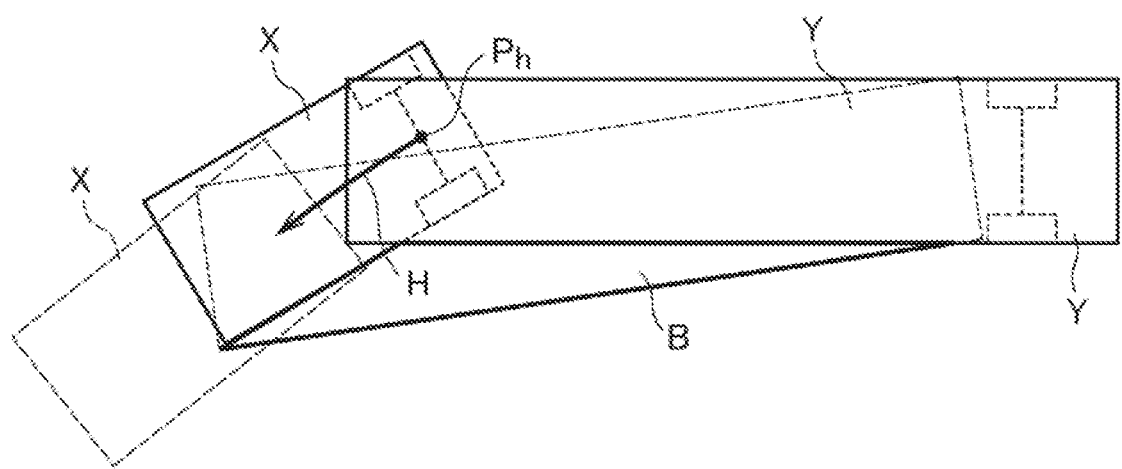
FIG. 9 is a diagram showing a passage prediction area of the towed vehicle Y calculated by the obstacle detection device according to the first embodiment.

Therefore, when used for the calculation of the monitoring area E, the passage prediction area A of the towing vehicle X may not be calculated, and only the passage prediction area B of the towed vehicle Y may be calculated as shown by the thick lines in FIG. 9. In this case, the passage prediction area A of the towing vehicle X may not be considered in the calculation of the monitoring area E. Further, the monitoring area E may be calculated using a preset fixed area or an area set by approximate calculation as the passage prediction area A of the towing vehicle X.

When the passage prediction area A is set by approximate calculation, for example, the vehicle body passage area may be set as the passage prediction area A by assuming that the towing vehicle X moves a predicted braking distance H in the direction of travel and moves in translation by the vehicle length of the towing vehicle X multiplied by tan δ in a direction perpendicular to the direction of travel. By performing this process, it is possible to reduce the additional processing when the obstacle detection device 40 calculates the monitoring area E.

Figure 10A:
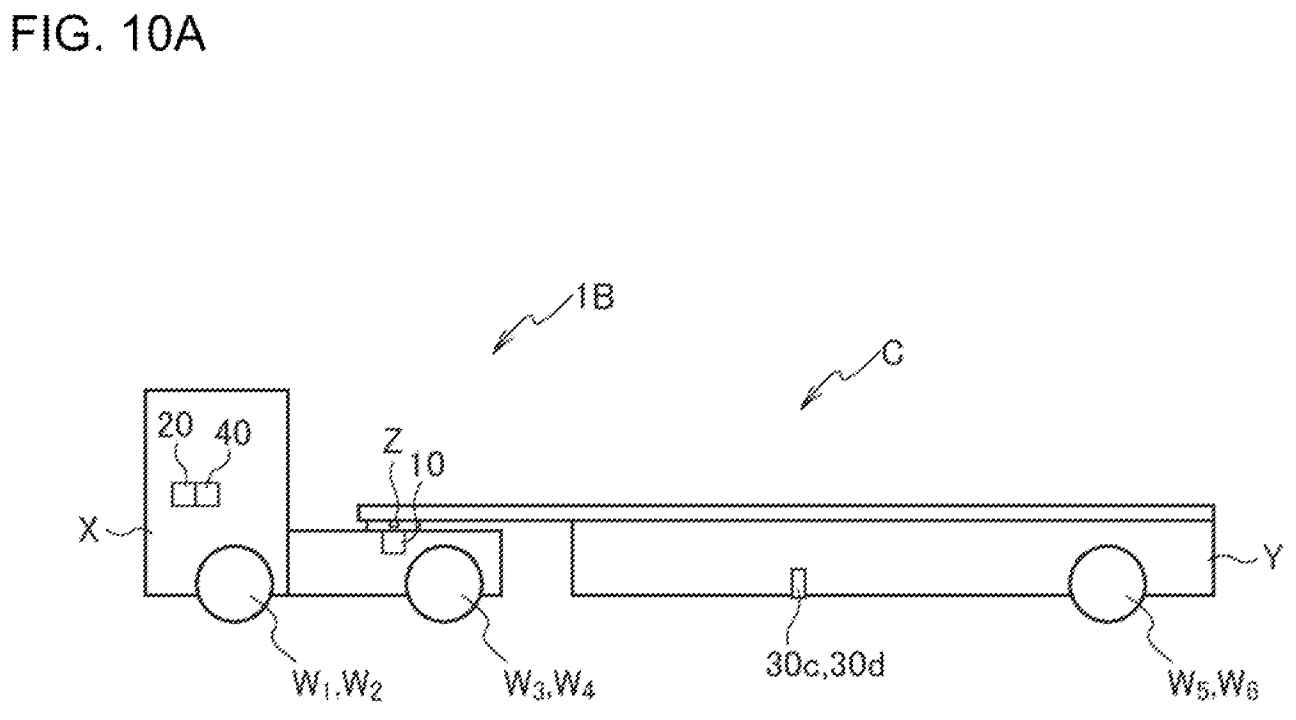
Figure 10B:
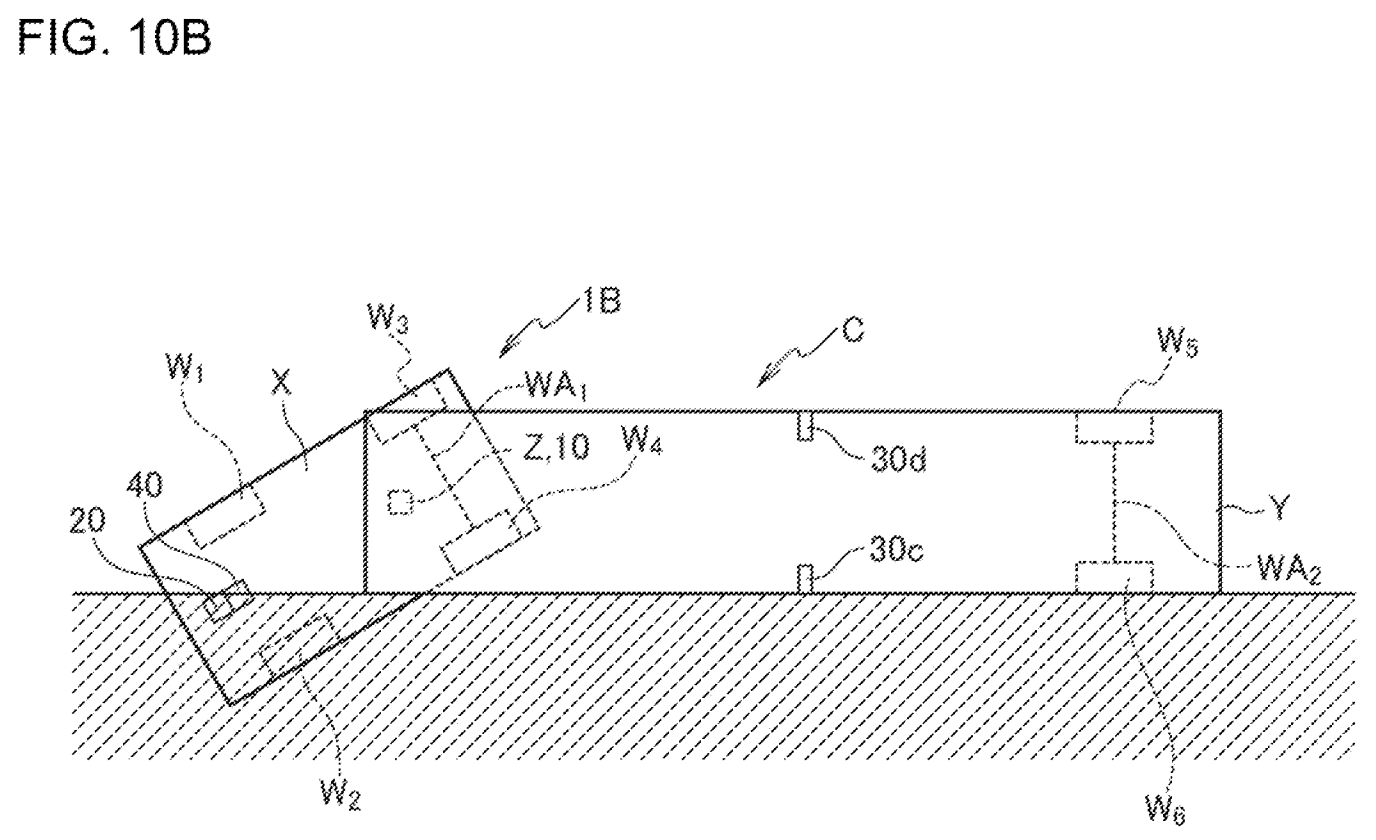

In the first embodiment, the case where the obstacle sensors 30a and 30b are installed on the towing vehicle X has been described, but as shown in FIGS. 10A and 10B, obstacle sensors 30c and 30d as obstacle sensors 30 may be installed in the left and right portions of the towed vehicle Y. In this case, for example, as shown in FIG. 10B, the obstacle sensor 30c on the left side of the towed vehicle Y may detect an obstacle within the range of 180° along the left side of the towed vehicle Y.

Second Embodiment

Since the articulated vehicle loads and transports luggage, if it stops suddenly, a strong force is applied to the luggage, and there is a risk that the luggage will come into contact with each other. Therefore, when the articulated vehicle turns and an obstacle that may be entrapped by the turn is detected, it is desirable to stop the articulated vehicle before it comes into contact with the obstacle while avoiding a sudden stop.

In the second embodiment, the autonomous driving system 1B will be described. When the articulated vehicle turns, the autonomous driving system 1B sets the deceleration according to the area in which an obstacle that may be entrapped by the turn is detected and stops the articulated vehicle.

(Configuration of an Autonomous Driving System According to the Second Embodiment)

As illustrated in FIGS. 10A and 10B, the configuration of the autonomous driving system 1B according to the second embodiment is the same as that of the autonomous driving system 1A of the first embodiment, except that the obstacle sensors 30c and 30d are installed on the towed vehicle Y. A detailed description of the parts having the same functions is omitted.

In the present embodiment, the passage area calculation unit 42 calculates a first passage prediction area as the passage prediction area. The first passage prediction area may be an area through which the towing vehicle X and the towed vehicle Y pass before moving the braking distance by stopping suddenly. Further, the passage area calculation unit 42 calculates a second passage prediction area as the passage prediction area. The second passage prediction area may be an area through which the towing vehicle X and the towed vehicle Y pass before moving the braking distance by stopping slowly. The sudden stop of the towing vehicle X and the towed vehicle Y may be performed by decelerating the speed of the towing vehicle X and the towed vehicle Y with a deceleration $a_1$ described later, which is a first deceleration. That is, the first passage prediction area may be an area through which the towing vehicle X and the towed vehicle Y decelerated by the deceleration $a_1$ pass before moving the braking distance. Further, the slow stop of the towing vehicle X and the towed vehicle Y may be performed by decelerating the speed of the towing vehicle X and the towed vehicle Y with a deceleration $a_2$ described later, which is a second deceleration. That is, the second passage prediction area may be an area through which the towing vehicle X and the towed vehicle Y decelerated by the deceleration $a_2$ smaller than the deceleration $a_1$ pass before moving the braking distance.

Further, in the present embodiment, the monitoring area calculation unit 43 calculates an area in which the calculated surrounding area and the first passage prediction area overlap as a first monitoring area. Further, the monitoring area calculation unit 43 calculates an area in which the calculated surrounding area and the second passage prediction area overlap as a second monitoring area.

Further, in the present embodiment, the obstacle detection unit 44 outputs obstacle detection information when detecting an obstacle within the first monitoring area or the second monitoring area among the obstacles detected by the obstacle sensors 30c and 30d. At that time, the obstacle detection unit 44 outputs the obstacle detection information by adding information indicating whether the position of the detected obstacle is within the first monitoring area or the second monitoring area. Further, when the obstacle sensors 30c and 30d detect one obstacle and the obstacle is within the first monitoring area or the second monitoring area, the obstacle detection unit 44 may output the obstacle detection information.

Further, in the present embodiment, when the operation control unit 50 acquires the obstacle detection information output from the obstacle detection unit 44, the operation control unit 50 determines whether the position of the obstacle is within the first monitoring area or the second monitoring area based on the information added to the obstacle detection information. When it is determined that the position of the obstacle is within the first monitoring area, the operation control unit 50 outputs a sudden stop instruction as a first stop instruction to the towing vehicle X, and when it is determined that the position of the obstacle is within the second monitoring area, the operation control unit 50 outputs a slow stop instruction as a second stop instruction to the towing vehicle X. The sudden stop instruction is an instruction to stop the towing vehicle X suddenly. When stopping the towing vehicle X suddenly, the traveling speed of the towing vehicle X may be reduced by deceleration $a_1$, for example. The slow stop instruction is an instruction to stop the towing vehicle X slowly. When stopping the towing vehicle X slowly, the traveling speed of the towing vehicle X may be reduced by deceleration $a_2$, for example. Here, the value of the deceleration $a_2$ is set to a value smaller than the value of the deceleration $a_1$. That is, the deceleration $a_2$ of the towing vehicle X set in the slow stop instruction may be smaller than the deceleration $a_1$ of the towing vehicle X set in the sudden stop instruction.

(Operation of the Autonomous Driving System According to the Second Embodiment)

Next, an example of the operation of the autonomous driving system 1B according to the present embodiment will be described with reference to the flowchart of FIG. 11. When the vehicle speed sensor 20 detects a vehicle speed equal to or greater than the first threshold and the angle sensor 10 detects a connection angle equal to or greater than the second threshold ("YES" in step S11), the obstacle detection device 40 executes the calculation process of the first monitoring area and the second monitoring area (step S12). The calculation process of the first monitoring area and the second monitoring area is the same process as the process shown in the flowchart of FIG. 4 described in the first embodiment.

Figure 12:
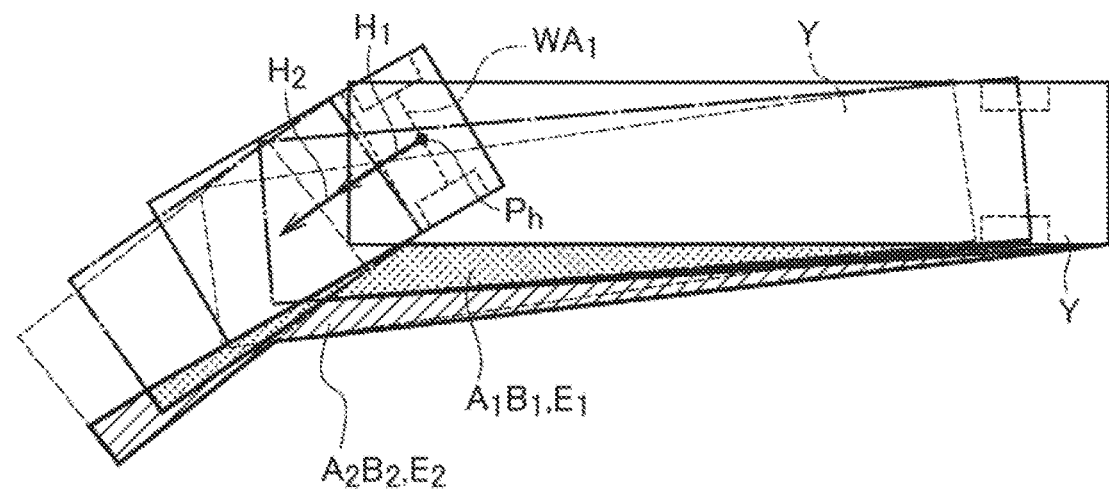
FIG. 12 is an explanatory diagram of a first predicted braking distance, a second predicted braking distance, a first monitoring area, and a second monitoring area of the towing vehicle X, calculated by the obstacle detection device according to the second embodiment.

Here, in the step of the calculation process of the monitoring area corresponding to step S23, when the passage area calculation unit 42 calculates the predicted braking distance, two predicted braking distance, i.e., a first predicted braking distance $H_1$ and a second predicted braking distance $H_2$ are calculated. The first predicted braking distance $H_1$ is the predicted braking distance of the center Ph of the axle $WA_1$ when the towing vehicle X stops suddenly at a large deceleration. The second predicted braking distance $H_2$ is the predicted braking distance of the center Ph of the axle $WA_1$ when the towing vehicle X stops slowly at a small deceleration. That is, as shown in FIG. 12, the first predicted braking distance $H_1$ is a shorter distance than the second predicted braking distance $H_2$.

Figure 13A:
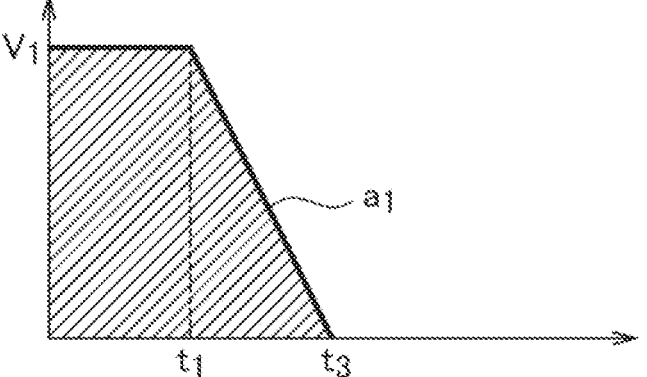
FIG. 13A is an explanatory diagram of a first vehicle stop model held by the obstacle detection device according to the second embodiment.
Figure 13B:
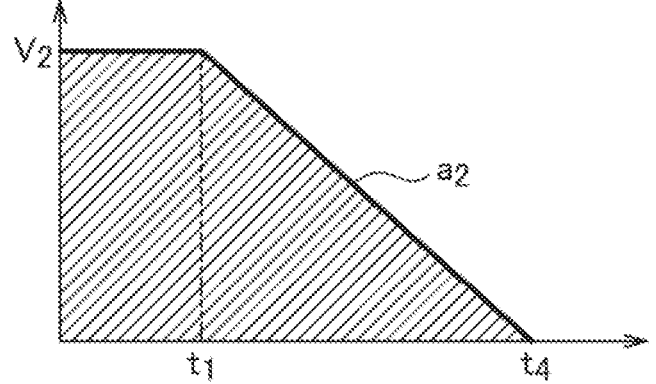
FIG. 13B is an explanatory diagram of a second vehicle stop model held by the obstacle detection device according to the second embodiment.

The passage area calculation unit 42 holds information on a first vehicle stop model and a second vehicle stop model set in advance. The first vehicle stop model is a model that shows the relationship between the speed change when the articulated vehicle C stops suddenly and the time until the stop. The second vehicle stop model is a model that shows the relationship between the speed change when the articulated vehicle C stops slowly and the time until the stop. FIG. 13A is an example of the first vehicle stop model held by the passage area calculation unit 42. FIG. 13B is an example of the second vehicle stop model held by the passage area calculation unit 42.

FIG. 13A shows the vehicle stop model in a case that the articulated vehicle C travels at speed $V_1$, brakes suddenly at time $t_1$, decelerates at deceleration $a_1$, and stops at stop time $t_3$. For example, the deceleration $a_1$ may be a greater value than the deceleration a (see FIG. 8). The area indicated by the diagonal lines in FIG. 13A corresponds to the first predicted braking distance $H_1$ of the center Ph of the axle $WA_1$ when the towing vehicle X stops suddenly, and specifically, the first predicted braking distance $H_1$ is calculated by the following equation (4).

[Equation 4]

$$H_1 = \left( V_1 T + \frac{V_1{}^2}{2a_1} \right) \times S + H_s \qquad (4)$$

Here, T is the time of the difference between time $t_1$ and time $t_3$. S is a safety factor that reflects the margin against errors. Hs is the distance of the margin for detecting contact with an obstacle in advance.

FIG. 13B shows the vehicle stop model when the articulated vehicle C travels at speed $V_2$, brakes suddenly at time $t_1$, decelerates at deceleration $a_2$, and stops at stop time $t_4$. The value of the deceleration $a_2$ is set to a value smaller than the value of the deceleration $a_1$. Further, the deceleration $a_2$ may be, for example, a value smaller than the deceleration $a_1$ and smaller than the deceleration a. The area indicated by the diagonal lines in FIG. 13B corresponds to the second predicted braking distance $H_2$ of the center Ph of the axle $WA_1$ when the towing vehicle X stops slowly, and specifically, the second predicted braking distance $H_2$ is calculated by the following equation (5).

[Equation 5]

$$H_2 = \left( V_2 T + \frac{V_2{}^2}{2a_2} \right) \times S + H_s \qquad (5)$$

Here, T is the time of the difference between time $t_1$ and time $t_4$. S is a safety factor that reflects the margin against errors. Hs is the distance of the margin for detecting contact with an obstacle in advance.

Next, as illustrated in FIG. 12, the passage area calculation unit 42 calculates the first passage prediction area $A_1B_1$. The first passage prediction area $A_1B_1$ is a passage prediction area until the center Ph of the axle $WA_1$ moves the first predicted braking distance $H_1$ on the turning trajectory and stops. Further, the passage area calculation unit 42 calculates the second passage prediction area $A_2B_2$. The second passage prediction area $A_2B_2$ is a passage prediction area until the center Ph of the axle $WA_1$ moves the second predicted braking distance $H_2$ on the turning trajectory and stops.

Next, the monitoring area calculation unit 43 calculates an overlapping area between the calculated surrounding area and the first passage prediction area $A_1B_1$ as the first monitoring area $E_1$ when the articulated vehicle C stops suddenly. Further, the monitoring area calculation unit 43 calculates an area excluding the first monitoring area $E_1$ from an overlapping area between the calculated surrounding area and the second passage prediction area $A_2B_2$ as the second monitoring area $E_2$ when the articulated vehicle C is stopped slowly. That is, the first monitoring area $E_1$ is an area adjacent to the vehicle body of the towing vehicle X and the towed vehicle Y, and the second monitoring area $E_2$ is adjacent to the first monitoring area $E_1$.

Figure 11:
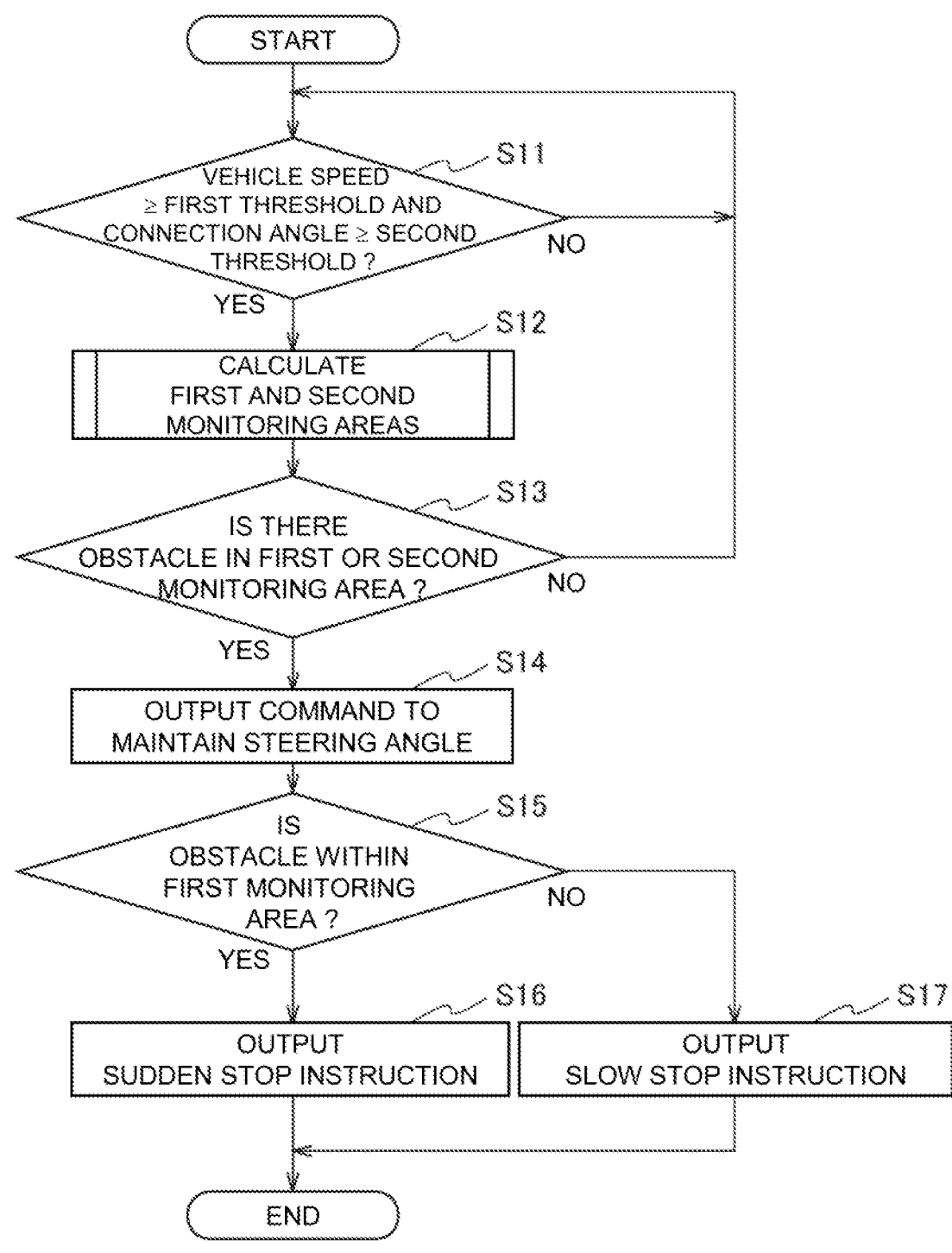
FIG. 11 is a flowchart illustrating an example of an operation executed by the obstacle detection device according to the second embodiment when the articulated vehicle turns.

Returning to the flowchart of FIG. 11, the obstacle detection unit 44 determines whether or not there is an obstacle in the calculated first monitoring area $E_1$ or the second monitoring area $E_2$ based on the information detected by the obstacle sensor 30 (step S13). Here, the second monitoring area $E_2$ is adjacent to the first monitoring area $E_1$ and exists on the traveling side of the articulated vehicle C, and the obstacle sensors 30c and 30d are installed on the rear towed vehicle Y to detect obstacles. Therefore, the occurrence of the occlusion area is suppressed, and the presence or absence of obstacles in the monitoring areas $E_1$ and $E_2$ can be more reliably monitored.

When the obstacle detection unit 44 determines that there is an obstacle in these areas ("YES" in step S13), the obstacle detection unit 44 outputs obstacle detection information to the operation control unit 50, wherein information indicating whether the position of the obstacle is within the first monitoring area $E_1$ or within the second monitoring area $E_2$ is added to the obstacle detection information. In step S13, when the obstacle detection unit 44 determines that there are no obstacles in the monitoring areas $E_1$ and $E_2$ ("NO" in step S13), the process returns to step S11 and the process is repeated.

When the operation control unit 50 acquires the obstacle detection information, the operation control unit 50 outputs a command to maintain the steering angle to the towing vehicle X (step S14). Further, the operation control unit 50 determines whether the position of the obstacle is in the first monitoring area $E_1$ or the second monitoring area $E_2$ based on the information added to the obstacle detection information (step S15).

Here, when the operation control unit 50 determines that the position of the obstacle is within the first monitoring area $E_1$ ("YES" in step S15), the operation control unit 50 outputs the sudden stop instruction to the towing vehicle X (step S16). When the towing vehicle X acquires the sudden stop instruction from the operation control unit 50, for example, it performs a braking operation to stop suddenly at deceleration $a_1$ based on the first vehicle stop model of FIG. 13A while maintaining the steering angle.

Further, in step S15, when the operation control unit 50 determines that the position of the obstacle is within the second monitoring area $E_2$ ("NO" in step S15), the operation control unit 50 outputs the slow stop instruction to the towing vehicle X (step S17). When the towing vehicle X acquires the slow stop instruction from the operation control unit 50, for example, it performs a brake operation to stop slowly at deceleration $a_2$ based on the second vehicle stop model of FIG. 13B while maintaining the steering angle.

According to the above second embodiment, when an obstacle that may be entrapped when the traveling articulated vehicle C turns is detected, the obstacle detection device 40 can provide highly accurate obstacle detection information to the operation control unit 50 with information on the position of the obstacle. The operation control unit 50 uses information on the position of the obstacle added to the obstacle detection information. Therefore, while avoiding the sudden stop of the articulated vehicle C more reliably, it is possible to more reliably suppress contact between the articulated vehicle C and the obstacle.

In the first embodiment and the second embodiment described above, the towing vehicle X that is an autonomous driving vehicle may be equipped with a function to monitor the area in front thereof. In the autonomous driving systems 1A and 1B, the monitoring area calculation unit 43 may calculate an area excluding the area in front of the towing vehicle X as the monitoring area to monitor the presence or absence of obstacles.

Figure 14:
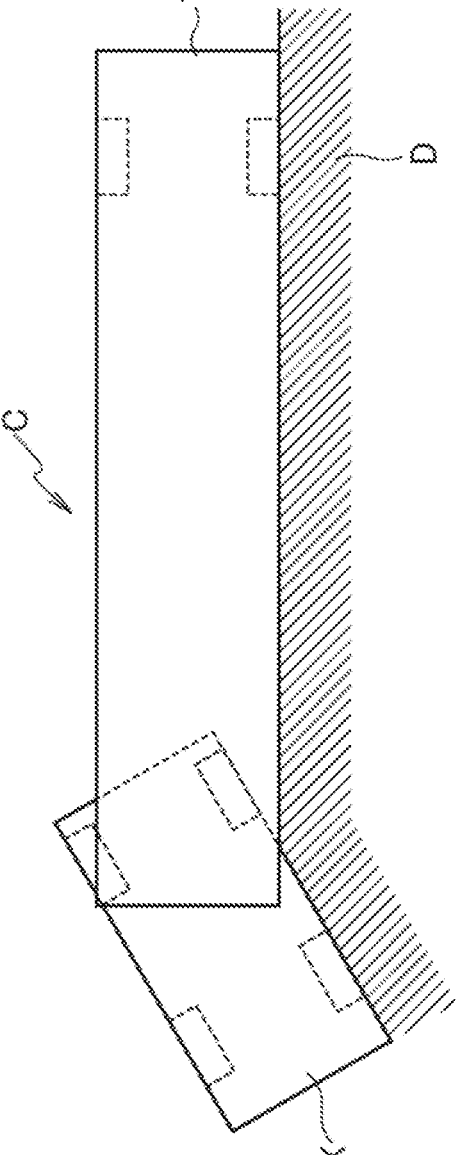
FIG. 14 is a diagram showing the surrounding area calculated by the obstacle detection device according to another embodiment.

Taking the first embodiment as an example, when the surrounding area calculation unit 41 calculates the surrounding area D, the area up to the front end of the towing vehicle X may be calculated as shown in FIG. 14. Further, the monitoring area calculation unit 43 may calculate the monitoring area excluding the area in front of the towing vehicle X. Thereby, it is possible to suppress a decrease in the monitoring accuracy when monitoring an obstacle that may be entrapped by the turning of the articulated vehicle C, and to reduce the processing load of the obstacle detection device 40. When the towing vehicle X turns, the obstacle detection range in front of the towing vehicle X, which is the direction of travel, changes greatly in a short time. Therefore, the processing load is greatly reduced.

Further, in the first embodiment and the second embodiment described above, the case where the towing vehicle X is an autonomous driving vehicle has been described, but the towing vehicle X may be a vehicle driven by a human. That is, the autonomous driving systems 1A and 1B may be an operation system of an articulated vehicle that is not an autonomous driving vehicle. Further, the autonomous driving systems 1A and 1B may be used when the towing vehicle X which is an autonomous driving vehicle is operated by the operation of the occupants. In that case, for example, when the operation control unit 50 outputs the command to maintain the steering angle, the steering of the towing vehicle X is locked, and when the stop instruction is output, a warning to the driver may be performed.

Next, the action effect of the obstacle detection device of the articulated vehicle, the operation system of the articulated vehicle, and the obstacle detection method of the articulated vehicle described above will be described.

(1) The obstacle detection device 40 of the articulated vehicle C is connected to an obstacle sensor 30 that detects obstacles in the surrounding of the towing vehicle X and the towed vehicle Y towed by the towing vehicle X. The obstacle detection device 40 includes the surrounding area calculation unit 41 that calculates the surrounding area D in the turning direction of the towing vehicle X and the towed vehicle Y when the towing vehicle X and the towed vehicle Y turn. Further, the obstacle detection device 40 includes the passage area calculation unit 42 that calculates the passage prediction area AB, A, B, $A_1B_1$, and $A_2B_2$ when the towing vehicle X and the towed vehicle Y turn. Further, the obstacle detection device 40 includes the monitoring area calculation unit 43 that calculates the area in which the surrounding area D detected by the surrounding area calculation unit 41 and the passage prediction area AB, A, B, $A_1B_1$, and $A_2B_2$ calculated by the passage area calculation unit 42 overlap as the monitoring area E, $E_1$, and $E_2$. Further, the obstacle detection device 40 includes the obstacle detection unit 44 that outputs the obstacle detection information indicating that an obstacle that may be entrapped by the turning of the towing vehicle X and the towed vehicle Y has been detected, in response to the obstacle detected by the obstacle sensor 30 being detected within the monitoring area E, $E_1$, $E_2$.

Thereby, when the traveling articulated vehicle C turns, it is suppressed that a part of the body of the articulated vehicle C is misrecognized as an obstacle. Therefore, the obstacle detection device 40 can accurately detect an obstacle that may be entrapped by the turning of the articulated vehicle C. Further, the obstacle detection device 40 can output information about the obstacle.

(2) The monitoring area calculation unit 43 may calculate the area excluding the area in front of the towing vehicle X as the monitoring area E, $E_1$, and $E_2$.

Thereby, it is possible to suppress a decrease in the accuracy of monitoring obstacles that may be entrapped by the turning of the articulated vehicle C, and to reduce processing load of the obstacle detection device 40.

(3) The passage area calculation unit 42 may calculate, as the passage prediction area AB, A, B, $A_1B_1$, $A_2B_2$, the area to be passed by the towing vehicle X and the towed vehicle Y before traveling the braking distance on the turning trajectory.

Thereby, the obstacle detection device 40 can calculate a more accurate passage prediction area. Therefore, it is possible to more reliably detect obstacles that may be entrapped by the turning of the articulated vehicle C.

(4) The passage area calculation unit 42 may calculate the first passage prediction area $A_1B_1$ and the second passage prediction area $A_2B_2$ as the passage prediction area AB, A, B, $A_1B_1$, $A_2B_2$, wherein the first passage prediction area $A_1B_1$ is an area through which the towing vehicle X and the towed vehicle Y pass before moving the braking distance by stopping suddenly, and the second passage prediction area $A_2B_2$ is an area through which the towing vehicle X and the towed vehicle Y pass before moving the braking distance by stopping slowly. The monitoring area calculation unit 43 may calculate the area in which the surrounding area D and the first passage prediction area $A_1B_1$ overlap as the first monitoring area $E_1$, and may calculate the area in which the surrounding area D and the second passage prediction area $A_2B_2$ overlap as the second monitoring area $E_2$. The obstacle detection unit 44 may output the obstacle detection information to which information indicating whether the position of the detected obstacle is in the first monitoring area $E_1$ or the second monitoring area $E_2$ is added in response to the obstacle being detected by the obstacle sensor 30 in the first monitoring area $E_1$ or the second monitoring area $E_2$.

Thereby, when an obstacle that may be entrapped by the turning of the articulated vehicle C during traveling is detected, the obstacle detection device 40 can output more accurate obstacle detection information to which information on the position of the obstacle is added.

(5) The operation systems 1A and 1B of the articulated vehicle C may be the operation system of the articulated vehicle having the operation control unit 50 connected to the obstacle detection device 40 of the articulated vehicle C. The operation control unit 50 may output the stop instruction to the towing vehicle X in response to acquiring obstacle detection information output from the obstacle detection device 40.

Thereby, when the traveling articulated vehicle C turns, it is suppressed that a part of the body of the articulated vehicle C is misrecognized as an obstacle. Therefore, it is possible to accurately detect obstacles that may be entrapped by the turning articulated vehicle C. Then, the operation systems 1A and 1B stop the towing vehicle X based on the obstacle detection information acquired from the obstacle detection device 40. Therefore, it is possible to suppress the collision between the articulated vehicle C and the obstacle at the time of turning of the articulated vehicle C. Furthermore, it is possible to suppress decelerating or stopping of the articulated vehicle C due to misrecognition of an obstacle. That is, the articulated vehicle C can be driven more appropriately.

(6) The operation system 1B of the articulated vehicle C may be the operation system 1B of the articulated vehicle C having the operation control unit 50 connected to the obstacle detection device 40 of the articulated vehicle C. The operation control unit 50 may determine whether the position of the obstacle is within the first monitoring area $E_1$ or the second monitoring area $E_2$ based on the information added to the obstacle detection information in response to acquiring obstacle detection information output from the obstacle detection device 40. Further, the operation control unit 50 may output the sudden stop instruction to the towing vehicle X in response to determining that the position of the obstacle is within the first monitoring area $E_1$. Further, the operation control unit 50 may output the slow stop instruction to the towing vehicle X in response to determining that the position of the obstacle is within the second monitoring area $E_2$.

Thereby, when an obstacle that may be entrapped when the traveling articulated vehicle C turns is detected, the obstacle detection device 40 can provide the operation control unit 50 with highly accurate obstacle detection information to which information related to the position of the obstacle is added. Then, the operation control unit 50 outputs the stop instruction using information on the position of the obstacle added to the obstacle detection information. Therefore, while avoiding the sudden stop of the articulated vehicle C more reliably, it is possible to more reliably suppress contact between the articulated vehicle C and the obstacle.

(7) The operation control unit 50 may output the instruction to maintain the current steering angle in response to acquiring obstacle detection information output from the obstacle detection device 40.

Thereby, the risk of contact between the articulated vehicle C and the obstacle due to the steering angle being changed to move toward the obstacle during the idle traveling time after braking operation can be more reliably suppressed.

(8) The towing vehicle X includes the autonomous driving mechanism, and the operation control unit 50 may output the stop instruction and the instruction to maintain the steering angle to the autonomous driving mechanism.

As a result, when an obstacle that may be entrapped by the turning articulated vehicle C is detected, the autonomous driving mechanism is controlled so as to perform braking operation while maintaining the steering angle of the articulated vehicle C. Therefore, it is possible to reliably suppress the risk of contact between the articulated vehicle C and the obstacle due to changing the steering angle to move toward the obstacle during the idle traveling time after braking operation.

(9) The obstacle detection method of the articulated vehicle C detects obstacles in the surrounding of the towing vehicle X and the towed vehicle Y towed by the towing vehicle X. The method includes the surrounding area calculation step for calculating the surrounding area D in the turning direction of the towing vehicle X and the towed vehicle Y when the towing vehicle X and the towed vehicle Y turn. The method includes the passage prediction area calculation step for calculating the passage prediction area $AB, A, B, A_1B_1, A_2B_2$ when the towing vehicle X and the towed vehicle Y turn. The method includes the monitoring area calculation step for calculating the area in which the surrounding area D detected by the surrounding area calculation step and the passage prediction area $AB, A, B, A_1B_1$, and $A_2B_2$ calculated by the passage prediction area calculation step overlap as the monitoring area $E, E_1$, and $E_2$. The method includes the obstacle detection step for outputting the obstacle detection information indicating that an obstacle that may be entrapped by the turning of the towing vehicle X and the towed vehicle Y has been detected, in response to the obstacle detected by the obstacle sensor 30 being detected within the monitoring area $E, E_1, E_2$, wherein the obstacle sensor 30 detects obstacles in the surrounding of the towing vehicle X and the towed vehicle Y.

Thereby, when the traveling articulated vehicle C turns, it is suppressed that a part of the body of the articulated vehicle C is misrecognized as an obstacle. Therefore, it is possible to accurately detect obstacles that may be entrapped by the turning of the articulated vehicle C. Further, information related to the obstacle can be output.

Although some embodiments have been described, it is possible to modify or transform the embodiments based on the above disclosure contents. All components of the above embodiments, and all the features described in the claims, may be individually extracted and combined as long as they do not contradict each other.

This disclosure can, for example, contribute to Goal 11 of the Sustainable Development Goals (SDGs), "Make cities and human settlements inclusive, safe, resilient and sustainable."

The invention claimed is:

1. An articulated vehicle, comprising:
a towing vehicle;
a towed vehicle towed by the towing vehicle;
an obstacle sensor configured to detect obstacles in a surrounding of the towing vehicle and the towed vehicle;
an obstacle detection controller connected to the obstacle sensor; and
an operation controller connected to the obstacle detection controller,
wherein
the obstacle detection controller is configured to:
calculate a surrounding area in a turning direction of the towing vehicle and the towed vehicle when the towing vehicle and the towed vehicle turn;
calculate a passage prediction area when the towing vehicle and the towed vehicle turn;
calculate an area in which the surrounding area and the passage prediction area overlap as a monitoring area; and
output an obstacle detection information indicating that an obstacle that may be entrapped by a turning of the towing vehicle and the towed vehicle has been detected, in response to the obstacle detected by the obstacle sensor being detected within the monitoring area,
the operation controller is configured to output a stop instruction to the towing vehicle in response to acquiring the obstacle detection information output from the obstacle detection controller, and
the towing vehicle is configured to perform a braking operation in response to receiving the stop instruction output from the operation controller.

2. The articulated vehicle according to claim 1, wherein the obstacle detection controller is configured to calculate an area excluding an area in front of the towing vehicle as the monitoring area.

3. The articulated vehicle according to claim 1, wherein the obstacle detection controller is configured to calculate, as the passage prediction area, an area to be passed by the towing vehicle and the towed vehicle before traveling a braking distance on a turning trajectory.

4. The articulated vehicle according to claim 3, wherein the obstacle detection controller is configured to
calculate, as the passage prediction area,
a first passage prediction area through which the towing vehicle and the towed vehicle pass before moving the braking distance by stopping suddenly, and
a second passage prediction area through which the towing vehicle and the towed vehicle pass before moving the braking distance by stopping slowly,
calculate
an area in which the surrounding area and the first passage prediction area overlap as a first monitoring area, and
an area in which the surrounding area and the second passage prediction area overlap as a second monitoring area, and
output the obstacle detection information to which information indicating whether a position of the detected obstacle is in the first monitoring area or the second monitoring area is added in response to the obstacle being detected by the obstacle sensor in the first monitoring area or the second monitoring area.

5. The articulated vehicle according to claim 4, wherein the operation controller is configured to
determine whether a position of the obstacle is within the first monitoring area or the second monitoring area based on the information added to the obstacle detection information in response to acquiring the obstacle detection information output from the obstacle detection controller,
output a sudden stop instruction to the towing vehicle in response to determining that the position of the obstacle is within the first monitoring area, and
output a slow stop instruction to the towing vehicle in response to determining that the position of the obstacle is within the second monitoring area.

6. The articulated vehicle according to claim 1, wherein the operation controller is configured to output an instruction to maintain a current steering angle in response to acquiring the obstacle detection information output from the obstacle detection controller.

7. The articulated vehicle according to claim 6, wherein
the towing vehicle includes an autonomous driving mechanism, and
the operation controller is configured to output the stop instruction and the instruction to maintain the steering angle to the autonomous driving mechanism.

8. An obstacle avoidance method of an articulated vehicle, detecting an obstacle in a surrounding of a towing vehicle and a towed vehicle towed by the towing vehicle and avoiding contact with the obstacle detected, comprising:
a surrounding area calculation step for calculating a surrounding area in a turning direction of the towing vehicle and the towed vehicle when the towing vehicle and the towed vehicle turn,
a passage prediction area calculation step for calculating a passage prediction area when the towing vehicle and the towed vehicle turn,
a monitoring area calculation step for calculating an area in which the surrounding area detected by the surrounding area calculation step and the passage prediction area calculated by the passage prediction area calculation step overlap as a monitoring area,
an obstacle detection step for outputting an obstacle detection information indicating that an obstacle that may be entrapped by a turning of the towing vehicle and the towed vehicle has been detected, in response to the obstacle detected by an obstacle sensor being detected within the monitoring area, wherein the obstacle sensor is configured to detect an obstacle in a surrounding of the towing vehicle and the towed vehicle,
a stop instruction step for outputting a stop instruction to the towing vehicle in response to the obstacle detection information output by the obstacle detection step, and
a braking operation step for performing a braking operation on the towing vehicle in response to the stop instruction output by the stop instruction step.

* * * * *